US012099712B2

United States Patent
Shu et al.

(10) Patent No.: US 12,099,712 B2
(45) Date of Patent: Sep. 24, 2024

(54) GESTURE RECOGNITION METHOD, APPARATUS AND SYSTEM BASED ON COUPLING CAPACITANCE

(71) Applicants: Beijing BOE Optoelectronics Technology Co., Ltd., Beijing (CN); BOE Technology Group Co., Ltd., Beijing (CN)

(72) Inventors: Xingjun Shu, Beijing (CN); Qingzhu Guan, Beijing (CN); Shuang Shi, Beijing (CN); Jinlong Zheng, Beijing (CN); Junjie Xu, Beijing (CN); Yanming Wang, Beijing (CN); Sa Li, Beijing (CN); Fuan Zhu, Beijing (CN); Yue An, Beijing (CN); Yadong Zhang, Beijing (CN); Zongli Gao, Beijing (CN); Cuie Wang, Beijing (CN); Shuainan Liu, Beijing (CN); Shengwei Yang, Beijing (CN); Lidong Wang, Beijing (CN); Libao Cui, Beijing (CN); Runfei Du, Beijing (CN); Qi Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 18 days.

(21) Appl. No.: 17/921,073

(22) PCT Filed: May 21, 2021

(86) PCT No.: PCT/CN2021/095227
§ 371 (c)(1),
(2) Date: Oct. 24, 2022

(87) PCT Pub. No.: WO2021/238802
PCT Pub. Date: Dec. 2, 2021

(65) Prior Publication Data
US 2023/0342020 A1    Oct. 26, 2023

(30) Foreign Application Priority Data
May 28, 2020  (CN) .......................... 202010467794.8

(51) Int. Cl.
*G06F 3/041*    (2006.01)
*G06F 3/044*    (2006.01)
*G06F 3/0488*   (2022.01)

(52) U.S. Cl.
CPC .......... *G06F 3/0488* (2013.01); *G06F 3/0416* (2013.01); *G06F 3/0446* (2019.05)

(58) Field of Classification Search
CPC .... G06F 3/0488; G06F 3/0416; G06F 3/0446; G06F 3/041; G06F 3/044; G06F 3/04883; G06F 3/04162
See application file for complete search history.

(56) References Cited

U.S. PATENT DOCUMENTS 7,834,847 B2 * 11/2010 Boillot ................. G06F 3/017
                                                         345/173
2009/0284465 A1 * 11/2009 Oki ...................... G06F 3/044
                                                          73/514.32

(Continued)

FOREIGN PATENT DOCUMENTS

| CN | 102446042 A | 5/2012 |
| CN | 103116432 A | 5/2013 |
| CN | 111625147 A | 9/2020 |

OTHER PUBLICATIONS

CN202010467794.8 first office action.
PCT/CN2021/095227 international search report.

*Primary Examiner* — Md Saiful A Siddiqui
(74) *Attorney, Agent, or Firm* — IPro, PLLC

(57) ABSTRACT

A gesture recognition method, apparatus and system based on coupling capacitance, which are configured to solve the technical problem in the prior art of it not being possible to recognize a complex gesture due to the fact that the coordinates of a manipulation body on a three-dimensional plane cannot be determined. The method comprises: establishing a (Continued)

spatial rectangular coordinate system by taking a first position point of a contact face of a capacitive touch screen as an origin; acquiring an X-axis coordinate and a Y-axis coordinate, in the spatial rectangular coordinate system, corresponding to a first sensor; acquiring the difference between a first coupling capacitance value and a second coupling capacitance value, and determining a Z-axis coordinate of at least one manipulation body in the spatial rectangular coordinate system according to the difference; and generating a movement trajectory of the at least one manipulation body according to a change in spatial coordinates of the at least one manipulation body in the spatial rectangular coordinate system, and identifying the movement trajectory to obtain a gesture recognition result.

16 Claims, 4 Drawing Sheets

(56) References Cited

U.S. PATENT DOCUMENTS

| 2013/0002598 A1* | 1/2013 | Heng | G06F 3/0446 |
| | | | 178/20.01 |
| 2015/0109242 A1* | 4/2015 | Wei | G06F 3/0412 |
| | | | 345/174 |
| 2015/0301688 A1* | 10/2015 | Cho | G06F 3/042 |
| | | | 345/175 |
| 2015/0324025 A1 | 11/2015 | Shin et al. | |

* cited by examiner

GESTURE RECOGNITION METHOD, APPARATUS AND SYSTEM BASED ON COUPLING CAPACITANCE

CROSS REFERENCE TO RELATED APPLICATIONS

The application is a US National Stage of International Application No. PCT/CN2021/095227, filed on May 21, 2021, which claims the priority from Chinese patent application No. 202010467794.8, filed with the China National Intellectual Property Administration on May 28, 2020 and entitled "GESTURE RECOGNITION METHOD, APPARATUS AND SYSTEM BASED ON COUPLING CAPACITANCE", which is hereby incorporated by reference in its entirety.

TECHNICAL FIELD

The disclosure relates to gesture recognition technique, in particular to a gesture recognition method, apparatus and system based on coupling capacitance.

BACKGROUND

Touch screens include resistive touch screens and capacitive touch screens, and further, the capacitive touch screens include self-capacitive touch screens and mutual-capacitive touch screens. With the progress of science and technology, the capacitive touch screens have been applied to various devices in a wide range. In the case of the capacitive touch screen, a transverse electrode and a longitudinal electrode are made of indium tin oxide (ITO) on glass surfaces. The transverse electrode and the longitudinal electrode of the self-capacitive touch screen and the ground together form two electrodes of a capacitor respectively. When an operating body (for example, a finger or other electrical conductors) approaches or touches the self-capacitive touch screen, capacitance of the operating body will be superimposed on capacitance of the screen body, resulting in increase of the capacitance of the screen body. The transverse electrode and the longitudinal electrode of the mutual-capacitive touch screen constitute two electrodes of a capacitor. When an operating body approaches or touches the mutual-capacitive touch screen, the operating body will affect the coupling between two nearby electrodes, thereby changing capacitance between the two electrodes.

SUMMARY

Embodiments of the disclosure provide a gesture recognition method, apparatus and system based on coupling capacitance. The method of gesture recognition based on coupling capacitance includes: establishing a spatial rectangular coordinate system by taking a first point of a contact surface of a capacitive touch screen as an origin, a Z axis of the spatial rectangular coordinate system being perpendicular to the contact surface; acquiring an X-axis coordinate and a Y-axis coordinate, in the spatial rectangular coordinate system, corresponding to a first sensor, where the first sensor is a sensor of the capacitive touch screen that forms the coupling capacitance along with at least one operating body and has the greatest capacitance change signal increase; acquiring a difference between first coupling capacitance and second coupling capacitance, and determining a Z-axis coordinate of the at least one operating body in the spatial rectangular coordinate system according to the difference, where the first coupling capacitance is coupling capacitance formed between the first sensor and a first signal line of the capacitive touch screen when the Z-axis coordinate corresponding to the at least one operating body is beyond a preset interval, and the second coupling capacitance is coupling capacitance formed between the first sensor and the first signal line when the Z-axis coordinate corresponding to the at least one operating body is within the preset interval; and generating a movement trajectory of the at least one operating body according to changes in spatial coordinates of the at least one operating body in the spatial rectangular coordinate system, and obtaining a gesture recognition result by recognizing the movement trajectory, where the spatial coordinates include the X-axis coordinate, the Y-axis coordinate and the Z-axis coordinate.

In some embodiments, the acquiring an X-axis coordinate and a Y-axis coordinate, in the spatial rectangular coordinate system, corresponding to a first sensor includes:
acquiring an output pin index of an integrated circuit of the capacitive touch screen corresponding to the first sensor, and determining the output pin index as the X-axis coordinate and the Y-axis coordinate of the at least one operating body in the spatial rectangular coordinate system.

In some embodiments, the determining the output pin index as the X-axis coordinate and the Y-axis coordinate of the at least one operating body in the spatial rectangular coordinate system includes: prestoring a correspondence between output pin indexes and coordinates in the spatial rectangular coordinate system; and determining an X-axis coordinate and a Y-axis coordinate corresponding to a current output pin index in the spatial rectangular coordinate system according to the correspondence as the X-axis coordinate and the Y-axis coordinate of the at least one operating body in the spatial rectangular coordinate system.

In some embodiments, the acquiring a difference between first coupling capacitance and second coupling capacitance includes: acquiring capacitance input to the first sensor by a charging module of an integrated circuit of the capacitive touch screen, where the charging module is configured to input capacitance to a sensor of which a capacitance change signal is increased in the capacitive touch screen, so as to reduce the capacitance change signal of the sensor; and determining the capacitance input to the first sensor as the difference between the first coupling capacitance and the second coupling capacitance.

In some embodiments, the determining a Z-axis coordinate of the at least one operating body in the spatial rectangular coordinate system according to the difference includes: determining the Z-axis coordinate of the at least one operating body in the spatial rectangular coordinate system according to a first formula and the difference, the first formula specifically being:

$$d = \frac{\varepsilon S}{4\pi k C_f}$$

where d represents the Z-axis coordinate of the at least one operating body in the spatial rectangular coordinate system, $C_f$ represents the difference, $\varepsilon$ represents a relative dielectric constant, S represents an effective overlapping area between the at least one operating body and the first sensor, and k represents an electrostatic force constant.

In some embodiments, the generating a movement trajectory of the at least one operating body according to changes in spatial coordinates of the at least one operating body in the spatial rectangular coordinate system includes: determining whether a Z-axis coordinate of any spatial coordinates of the at least one operating body in the spatial rectangular coordinate system is within the preset interval; determining that the any spatial coordinates are valid spatial coordinates in response to the Z-axis coordinate of the any spatial coordinates of the at least one operating body in the spatial rectangular coordinate system being within the preset interval; and generating the movement trajectory of the at least one operating body according to changes in the valid spatial coordinates.

In some embodiments, the establishing a spatial rectangular coordinate system by taking a first point of a contact surface of a capacitive touch screen as an origin, a Z axis of the spatial rectangular coordinate system being perpendicular to the contact surface includes: establishing the spatial rectangular coordinate system by taking a center point of the contact surface of the capacitive touch screen as the origin, the Z axis of the spatial rectangular coordinate system being perpendicular to the contact surface.

An embodiment of the disclosure further provides an apparatus of gesture recognition based on coupling capacitance. The apparatus of gesture recognition based on coupling capacitance includes: a first processing module configured to establish a spatial rectangular coordinate system by taking a first point of a contact surface of a capacitive touch screen as an origin, a Z axis of the spatial rectangular coordinate system being perpendicular to the contact surface; a first determining module configured to acquire an X-axis coordinate and a Y-axis coordinate, in the spatial rectangular coordinate system, corresponding to a first sensor, where the first sensor is a sensor of the capacitive touch screen that forms the coupling capacitance along with at least one operating body and has the greatest capacitance change signal increase; a second determining module configured to acquire a difference between first coupling capacitance and second coupling capacitance, and determine a Z-axis coordinate of the at least one operating body in the spatial rectangular coordinate system according to the difference, where the first coupling capacitance is coupling capacitance formed between the first sensor and a first signal line of the capacitive touch screen when the Z-axis coordinate corresponding to the at least one operating body is beyond a preset interval, and the second coupling capacitance is coupling capacitance formed between the first sensor and the first signal line of the capacitive touch screen when the Z-axis coordinate corresponding to the at least one operating body is within the preset interval; and a second processing module configured to generate a movement trajectory of the at least one operating body according to changes in spatial coordinates of the at least one operating body in the spatial rectangular coordinate system, and recognize the movement trajectory to obtain a gesture recognition result, where the spatial coordinates include the X-axis coordinate, the Y-axis coordinate and the Z-axis coordinate.

In some embodiments, the first determining module is specifically configured to: acquire an output pin index of an integrated circuit of the capacitive touch screen corresponding to the first sensor, and determine the output pin index as the X-axis coordinate and the Y-axis coordinate of the at least one operating body in the spatial rectangular coordinate system.

In some embodiments, the first determining module is specifically configured to: prestore a correspondence between output pin indexes and coordinates in the spatial rectangular coordinate system; and determine an X-axis coordinate and a Y-axis coordinate corresponding to a current output pin index in the spatial rectangular coordinate system according to the correspondence as the X-axis coordinate and the Y-axis coordinate of the at least one operating body in the spatial rectangular coordinate system.

In some embodiments, the second determining module is specifically configured to: acquire capacitance input to the first sensor by a charging module of an integrated circuit of the capacitive touch screen, where the charging module is configured to input capacitance to a sensor of which a capacitance change signal is increased in the capacitive touch screen, so as to reduce the capacitance change signal of the sensor; and determine the capacitance input to the first sensor as the difference between the first coupling capacitance and the second coupling capacitance.

In some embodiments, the second determining module is specifically configured to: determine the Z-axis coordinate of the at least one operating body in the spatial rectangular coordinate system according to a first formula and the difference, the first formula specifically being:

$$d = \frac{\varepsilon S}{4\pi k C_f}$$

where d represents the Z-axis coordinate of the at least one operating body in the spatial rectangular coordinate system, $C_f$ represents the difference, $\varepsilon$ represents a relative dielectric constant, S represents an effective overlapping area between the at least one operating body and the first sensor, and k represents an electrostatic force constant.

In some embodiments, the second processing module is specifically configured to: determine whether a Z-axis coordinate of any spatial coordinates of the at least one operating body in the spatial rectangular coordinate system is within the preset interval; determine that the any spatial coordinates are valid spatial coordinates in response to the Z-axis coordinate of the any spatial coordinates of the at least one operating body in the spatial rectangular coordinate system being within the preset interval; and generate the movement trajectory of the at least one operating body according to changes in the valid spatial coordinates.

In some embodiments, the first processing module is specifically configured to: establish the spatial rectangular coordinate system by taking a center point of the contact surface of the capacitive touch screen as the origin, the Z axis of the spatial rectangular coordinate system being perpendicular to the contact surface.

In some embodiments, the first signal line is a thin film transistor (TFT) power signal control line.

An embodiment of the disclosure further provides a system of gesture recognition based on coupling capacitance. The system of gesture recognition based on coupling capacitance includes: a memory configured to store a program instruction; and a processor configured to call the program instruction stored in the memory to execute steps of the method provided in the embodiment of the disclosure according to the obtained program instruction.

An embodiment of the disclosure further provides a storage medium. The storage medium stores a computer-executable instruction, where the computer-executable instruction is configured to cause a computer to execute steps of the method provided in the embodiment of the disclosure.

BRIEF DESCRIPTION OF THE DRAWINGS

In order to describe the technical solutions of the embodiments of the disclosure or in the related art more clearly, the accompanying drawings required for describing the embodiments are briefly described below. Obviously, the accompanying drawings in the following description show merely some embodiments of the disclosure.

DETAILED DESCRIPTION

Figure 1:
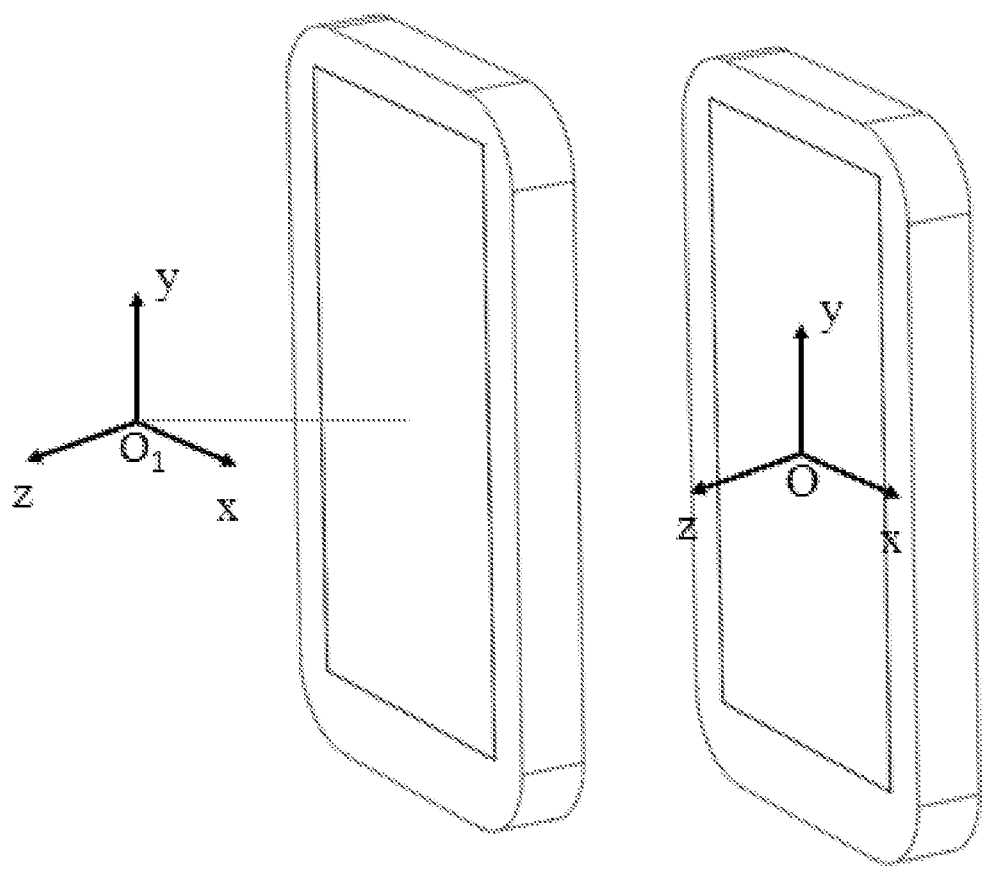
FIG. 1 is a schematic structural diagram of an electronic device provided with a capacitive touch screen in embodiments of the disclosure.

In order to make the objectives, technical solutions and advantages of the disclosure clearer, the technical solutions of the embodiments of the disclosure are clearly and completely described below in combination with the accompanying drawings in the embodiments of the disclosure. Obviously, the described embodiments are merely part rather than all of the embodiments of the disclosure. On the basis of the embodiments of the disclosure, all other embodiments obtained by those of ordinary skill in the art without making inventive efforts fall within the scope of protection of the disclosure. The embodiments of the disclosure and features in the embodiments can be combined mutually if there is no conflict. Moreover, although a logical order is shown in the flow diagram, in some cases, the steps shown or described can be executed in an order other than that shown herein.

The terms "first", "second", "third", etc. in the description, claims and the above accompanying drawings of the disclosure are configured to distinguish different objects, instead of being configured to describe a specific order. In addition, the term "include", as well as any variations thereof, are intended to cover non-exclusive protection. For example, a process, method, system, product or device that includes a series of steps or units is not limited to the listed steps or units, but may optionally include steps or units not listed, or may optionally include other steps or units inherent to such process, method, product or device.

In embodiments of the disclosure, "at least one" can mean at least two, such as two, three or more, which is not limited in the embodiments of the disclosure.

In addition, the term "and/or" herein is only used to describe an associated relation between associated objects and means three relations, for example, A and/or B can mean that A exists independently, A and B exist at the same time, or B exists independently. Moreover, the character "/" herein, unless otherwise specified, generally indicates that the associated objects are in an "or" relation.

At present, when an operating body approaches or touches a capacitive touch screen, coordinates of a corresponding point of the operating body on the capacitive touch screen are generally determined according to a change in capacitance of the capacitive touch screen, and accordingly, a gesture is recognized according to coordinates of a number of corresponding points. For example, when an operating body approaches or touches a capacitive touch screen, a transverse electrode and a longitudinal electrode of the self-capacitive touch screen are measured, and an X-axis coordinate and a Y-axis coordinate of a corresponding point of the operating body on the self-capacitive touch screen are determined according to a change in capacitance before and after approach or touch. For the mutual-capacitive touch screen, capacitance of junctions of all the transverse electrodes and the longitudinal electrodes, that is, capacitances in the two-dimensional plane of the entire touch screen is determined according to the transverse electrodes transmitting excitation signals and the longitudinal electrodes receiving the excitation signals, and then an X-axis coordinate and a Y-axis coordinate of a corresponding point of the operating body on the self-capacitive touch screen are determined according to variation data of the two-dimensional capacitance of the touch screen. In other words, when a gesture is recognized according to a change in capacitance of a capacitive touch screen, only coordinates of an operating body on a two-dimensional plane, that is, an X-axis coordinate and a Y-axis coordinate of the operating body, may be determined, but coordinates of the operating body on a three-dimensional plane, that is, an X-axis coordinate, a Y-axis coordinate and a Z-axis coordinate of the operating body may not be determined. It can be seen that there is a problem in the related art that when a gesture is recognized according to a change in capacitance of the capacitive touch screen, coordinates of the operating body on a three-dimensional plane may not be determined, and complex gestures may not be recognized.

In view of this, embodiments of the disclosure provide a method of gesture recognition based on coupling capacitance. Through the method, a spatial rectangular coordinate system is established by taking a first point of a contact surface of a capacitive touch screen as an origin, a Z axis of the spatial rectangular coordinate system being perpendicular to the contact surface. Then an X-axis coordinate and a Y-axis coordinate, in the spatial rectangular coordinate system, corresponding to a first sensor are acquired, where the first sensor is a sensor of the capacitive touch screen that forms the coupling capacitance along with at least one operating body and has the greatest capacitance change signal increase. A difference between first coupling capacitance and second coupling capacitance is acquired, and a Z-axis coordinate of at least one operating body in the spatial rectangular coordinate system is determined according to the difference, where the first coupling capacitance is coupling capacitance formed between the first sensor and a first signal line, such as a thin film transistor (TFT) power signal control line, of the capacitive touch screen when the Z-axis coordinate corresponding to the at least one operating body is beyond a preset interval, and the second coupling capacitance is coupling capacitance formed between the first sensor and a first signal line when the Z-axis coordinate corresponding to the at least one operating body is within the preset interval. Finally, a movement trajectory of the at least one operating body is generated according to changes in spatial coordinates of the at least one operating body in the spatial rectangular coordinate system, and the movement trajectory is recognized to obtain a gesture recognition result. Coordinates of at least one operating body on a three-dimensional plane are determined according to a difference between coupling capacitance formed between a sensor and a first signal line when the at least one operating body approaches or touches a capacitive touch screen and coupling capacitance formed between the sensor and the first signal line when the at least one operating body does not approach the capacitive touch screen, and an output pin index of an integrated circuit of the capacitive touch screen corresponding to the sensor, where spatial coordinates include: an X-axis coordinate, a Y-axis coordinate and a Z-axis coordinate, so that a complex gesture is recognized.

In order to have a better understanding of the technical solutions, the technical solutions of the disclosure are described in detail below through the accompanying drawings and the specific embodiments. It should be understood that the embodiments of the disclosure and the specific features in the embodiments are detailed descriptions of the technical solutions to the disclosure, rather than the limitations on the technical solutions of the disclosure. The embodiments of the disclosure and the technical features in the embodiments may be combined with one another without conflict.

FIG. 1 shows a structure of an electronic device provided with a capacitive touch screen, and the method provided in embodiments of the disclosure is applicable to the touch screen. The electronic device provided with a capacitive touch screen to which the method provided in embodiments of the disclosure is applicable includes a tablet computer, a smart watch, a smart phone, etc. provided with a capacitive touch screen. For convenience of description, a smart phone provided with a capacitive touch screen to serve is taken as the electronic device provided with a capacitive touch screen to which the method provided in embodiments of the disclosure is applicable. Certainly, the method provided in embodiments of the disclosure is applicable to various electronic devices provided with a capacitive touch screen. It should be understood that the electronic device provided with a capacitive touch screen shown in FIG. 1 is a detailed description of a system of gesture recognition based on coupling capacitance to which the method provided in embodiments of the disclosure is applicable, but is not intended to limit the electronic devices provide with a capacitive touch screen to which the method provided in embodiments of the disclosure is applicable.

Figure 2A:
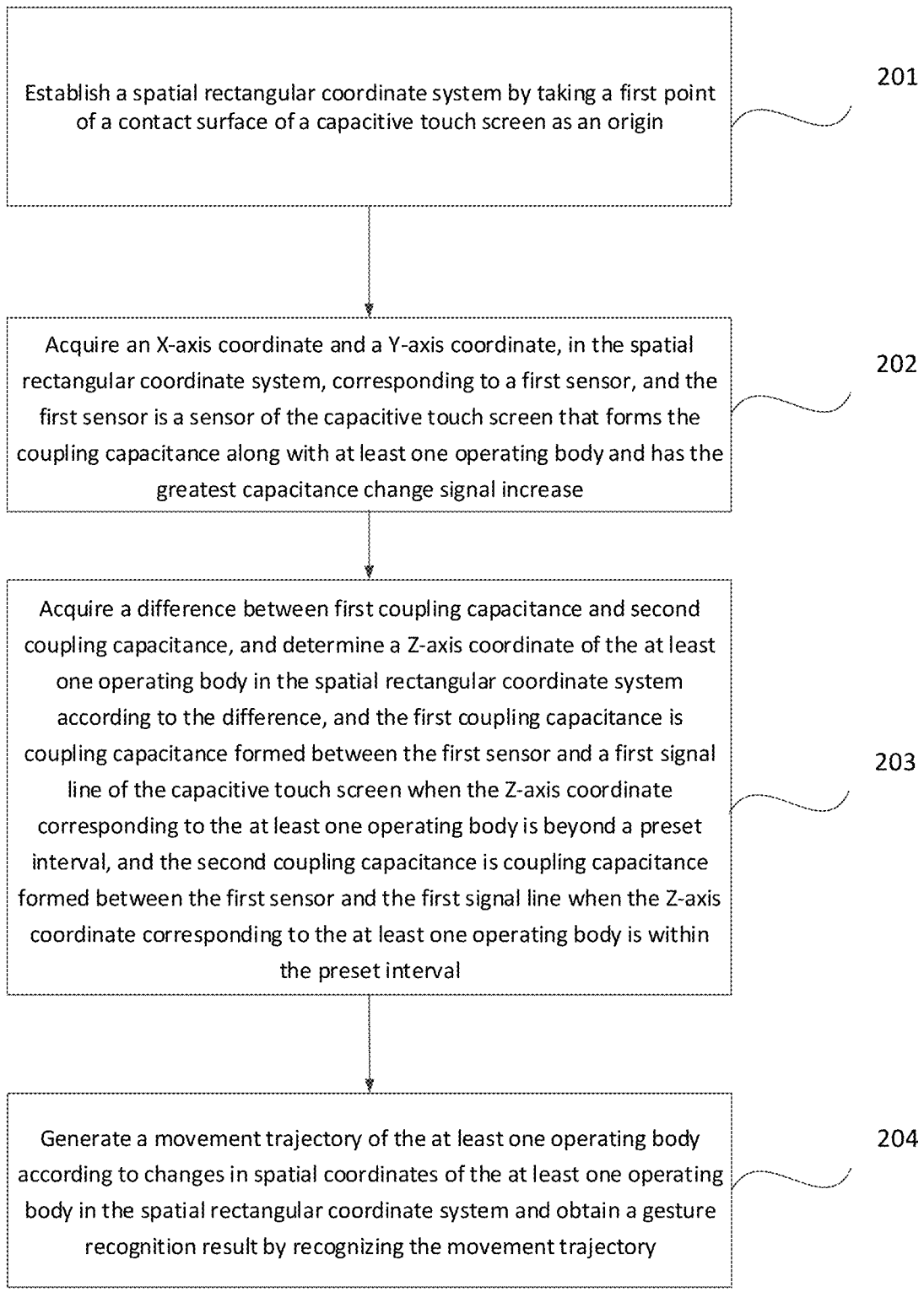
FIG. 2A is a schematic flow chart of a method of gesture recognition based on coupling capacitance in embodiments of the disclosure.

In the capacitive touch screen of the smart phone shown in FIG. 1, transverse electrodes and longitudinal electrodes are made of indium tin oxide (ITO) on a glass surface of the contact surface, and O (0, 0, 0) is the first point of the contact surface of the capacitive touch screen. Specifically, the first point may be a center point of the contact surface of the capacitive touch screen, and a spatial rectangular coordinate system is established by taking O (0, 0, 0) as the origin, the Z axis of the spatial rectangular coordinate system being perpendicular to the contact surface of the capacitive touch screen, and $O_1$ (X, Y, Z) indicates a relative position of an operating body (such as a finger or other electrical conductors) and the capacitive touch screen at a moment. The capacitive touch screen may be a self-capacitive touch screen or a mutual-capacitive touch screen. If the capacitive touch screen is a self-capacitive touch screen, electrode blocks (or a transverse electrode and a corresponding longitudinal electrode, here the electrode structure may be different as the structure of the capacitive touch screen is different) in the capacitive touch screen and the ground form two electrodes of a capacitor respectively. When an operating body approaches or touches the capacitive touch screen, capacitance of the operating body will be superimposed on capacitance of a screen body, so that the capacitance of the screen body is increased. If the capacitive touch screen is a mutual-capacitive touch screen, a transverse electrode and a corresponding longitudinal electrode in the capacitive touch screen form two electrodes of a capacitor, and when an operating body approaches or touches the capacitive touch screen, the operating body will affect coupling between two nearby electrodes, thereby changing capacitance between the two electrodes. With reference to FIG. 2A, embodiments of the disclosure provide a method of gesture recognition based on coupling capacitance, which may be executed by the electronic device provided with a capacitive touch screen shown in FIG. 1. The specific process of the method is described below.

Step 201: establishing a spatial rectangular coordinate system by taking a first point of a contact surface of a capacitive touch screen as an origin, a Z axis of the spatial rectangular coordinate system being perpendicular to the contact surface.

Figure 2B:
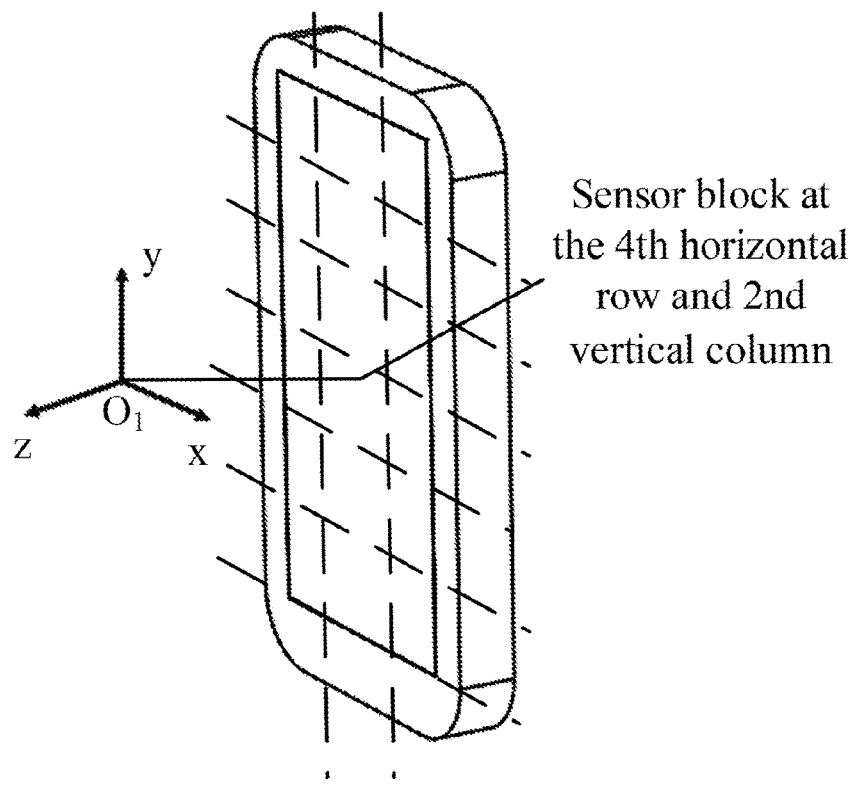
FIG. 2B is a schematic structural diagram of an electronic device provided with a capacitive touch screen in embodiments of the disclosure.

In embodiments of the disclosure, a plurality of sensors in the capacitive touch screen may divide the contact surface of the capacitive touch screen into a plurality of sensor blocks having the same size, and a spatial rectangular coordinate system is established by taking a first point of the contact surface of the capacitive touch screen as an origin, where the first point may be specifically a center point of the contact surface of the capacitive touch screen, and a Z axis of the spatial rectangular coordinate system is perpendicular to the contact surface of the capacitive touch screen. That is, a spatial rectangular coordinate system is established by taking a set sensor block in the capacitive touch screen as an origin, and the sensor may be positioned at a first point of the capacitive touch screen. For example, with reference to FIG. 2B, a plurality of sensors in the capacitive touch screen divide a contact surface of the capacitive touch screen into 7×3 sensor blocks having the same size in 7 horizontal rows and 3 vertical columns. The spatial rectangular coordinate system is established by taking the first point of the contact surface of the capacitive touch screen as the origin, that is, the spatial rectangular coordinate system is established by taking the sensor block positioned at the 4th horizontal row and 2nd vertical column as the origin.

Step 202: acquiring an X-axis coordinate and a Y-axis coordinate, in the spatial rectangular coordinate system, corresponding to a first sensor. In some embodiments, the step 202 may include: acquire an output pin index of an integrated circuit of the capacitive touch screen corresponding to the first sensor, and determine the output pin index as the X-axis coordinate and the Y-axis coordinate of the at least one operating body in the spatial rectangular coordinate system, where the first sensor is a sensor of the capacitive touch screen that forms the coupling capacitance along with at least one operating body and has the greatest capacitance change signal increase.

In some embodiments, the steps of acquiring an output pin index of an integrated circuit of the capacitive touch screen corresponding to the first sensor and determining the output pin index as the X-axis coordinate and the Y-axis coordinate of the at least one operating body in the spatial rectangular coordinate system may include:

prestoring a correspondence between output pin indexes and coordinates in the spatial rectangular coordinate system; and determining an X-axis coordinate and a Y-axis coordinate corresponding to a current output pin index in the spatial rectangular coordinate system according to the correspondence.

In embodiments of the disclosure, when at least one operating body approaches or touches the capacitive touch screen, coupling capacitance is formed between the at least one operating body and a plurality of nearby sensors, such that the capacitance change signal of the plurality of nearby sensors is increased, and the sensor that forms the coupling capacitance with the at least one operating body and has the greatest capacitance change signal increment is determined as the first sensor, where the at least one operating body may be a finger or other electrical conductors.

The plurality of sensors in the capacitive touch screen are connected with an integrated circuit (IC) in the capacitive touch screen via metal wires, and the index of each metal wire corresponds to the index of an input/output pin of the IC in a one-to-one correspondence mode. That is, each sensor corresponds to an index of the input/output pin of the IC in a one-to-one correspondence mode. When coupling capacitance is formed between at least one operating body and the first sensor, coupling capacitance formed between the first sensor and the first signal line (in some embodiment, it may be a thin film transistor (TFT) power signal control line of the capacitive touch screen) will be different from coupling capacitance formed between other sensors near the first sensor and the TFT power signal control line of the capacitive touch screen, where the TFT power signal control line is positioned between the sensors. According to a feedback difference signal, the output pin index of the IC corresponding to the first sensor is acquired, and the output pin index is determined as the X-axis coordinate and the Y-axis coordinate of at least one operating body in the spatial rectangular coordinate system. For convenience of understanding, description will be made below with examples.

For example, when coupling capacitance is formed between at least one operating body and the first sensor, coupling capacitance formed between the first sensor and the TFT power signal control line of the capacitive touch screen is different from coupling capacitance formed between other sensors near the first sensor and the TFT power signal control line of the capacitive touch screen, and the first sensor feeds back the difference to the IC via the metal line 5 connected to the IC. Since the index of each metal line corresponds to the output pin index of the IC in a one-to-one correspondence mode, the output pin index of the IC corresponding to the first sensor is 5, and then the X-axis coordinate and the Y-axis coordinate of the at least one operating body in the spatial rectangular coordinate system is determined as 5.

Step 203: acquiring the difference between first coupling capacitance and second coupling capacitance, and determining a Z-axis coordinate of the at least one operating body in the spatial rectangular coordinate system according to the difference, where the first coupling capacitance is coupling capacitance formed between the first sensor and a first signal line of the capacitive touch screen when the Z-axis coordinate corresponding to the at least one operating body is beyond a preset interval, and the second coupling capacitance is coupling capacitance formed between the first sensor and the first signal line when the Z-axis coordinate corresponding to the at least one operating body is within the preset interval.

In embodiments of the disclosure, the IC in the capacitive touch screen includes a charging module, where the charging module includes charging capacitors having different capacitance and is configured to make the capacitance change signal of each sensor of the capacitive touch screen the same through charging and discharging when the capacitive touch screen displays in different colors. When at least one operating body approaches or touches a first sensor, coupling capacitance is formed between the at least one operating body and the first sensor, so that the capacitance change signal of the first sensor is increased. In this case, the charging module of the IC inputs capacitance to the first sensor, so as to reduce the capacitance change signal of the first sensor and prevent other sensors near the first sensor from being influenced. Therefore, the capacitance input to the first sensor by the charging module of the IC is a difference between the first coupling capacitance and the second coupling capacitance. The first coupling capacitance is coupling capacitance formed between the first sensor and the TFT power signal control line of the capacitive touch screen when at least one operating body does not approach or touch the first sensor, that is, coupling capacitance formed between the first sensor and the TFT power signal control line of the capacitive touch screen when the Z-axis coordinate of at least one operating body in the spatial rectangular coordinate system is beyond the preset interval. The second coupling capacitance is coupling capacitance formed between the first sensor and the TFT power signal control line of the capacitive touch screen when the at least one operating body approaches or touches the first sensor, that is, the coupling capacitance formed between the first sensor and the TFT power signal control line of the capacitive touch screen when the Z-axis coordinate of at least one operating body in the spatial rectangular coordinate system is within the preset interval. For convenience of understanding, the description will be made below with examples.

For example, the charging module of the IC including charging capacitors having different capacitance first inputs charging capacitance of 10×100 pF to the first sensor, and if the capacitance change signal of the first sensor is still high, the charging module further inputs charging capacitance of 5×10 pF to the first sensor. If the capacitance change signal of the first sensor is normal, it is determined that the capacitance input by the charging module of the IC to the first sensor is $C_f$=100 pF*10+10 pF*5=1050 pF, that is, the difference between the first coupling capacitance and the second coupling capacitance is 1050 pF.

After the difference between the first coupling capacitance and the second coupling capacitance is acquired, since the difference between the first coupling capacitance and the second coupling capacitance is coupling capacitance formed between the at least one operating body and the first sensor, a correlation operation may be carried out on the difference between the first coupling capacitance and the second coupling capacitance through a first formula, to determine the Z-axis coordinate of the at least one operating body in the spatial rectangular coordinate system. In some embodiments, the first formula is:

$$d = \frac{\varepsilon S}{4\pi k C_f}$$

where d represents the Z-axis coordinate of the at least one operating body in the spatial rectangular coordinate system, $C_f$ represents the difference between the first coupling capacitance and the second coupling capacitance, ε represents a relative dielectric constant, S represents an effective overlapping area between the at least one operating body and the first sensor, and k represents an electrostatic force constant.

Step 204: generating a movement trajectory of the at least one operating body according to changes in spatial coordinates of the at least one operating body in the spatial rectangular coordinate system, and obtaining a gesture recognition result by recognizing the movement trajectory, and the spatial coordinates include the X-axis coordinate, the Y-axis coordinate and the Z-axis coordinate.

In embodiments of the disclosure, whether a Z-axis coordinate of any spatial coordinates of at least one operating body in a spatial rectangular coordinate system is within a preset interval is determined, if yes, it is determined that the any spatial coordinates are valid spatial coordinates, and a movement trajectory of the at least one operating body is generated according to changes in valid spatial coordinates, and the movement trajectory is recognized to obtain a gesture recognition result.

Figure 3:
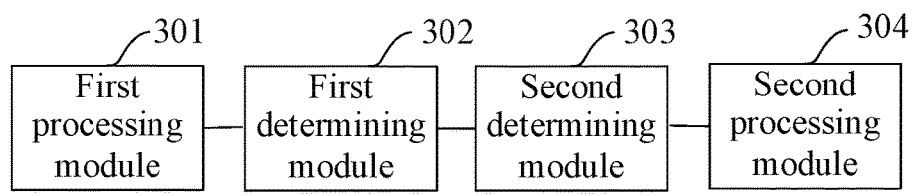
FIG. 3 is a schematic structural diagram of an apparatus of gesture recognition based on coupling capacitance in embodiments of the disclosure.

On the basis of the same disclosed concept, embodiments of the disclosure provide an apparatus of gesture recognition based on coupling capacitance, which may realize the functions corresponding to the method of gesture recognition based on coupling capacitance. The apparatus of gesture recognition based on coupling capacitance may be a hardware structure, a software module, or a hardware structure plus a software module. The apparatus of gesture recognition based on coupling capacitance may be realized by means of a chip system, and the chip system may be composed of a chip, and may include a chip and other discrete devices. With reference to FIG. 3, the apparatus of gesture recognition based on coupling capacitance includes a first processing module 301, a first determining module 302, a second determining module 303 and a second processing module 304.

The first processing module 301 is configured to establish a spatial rectangular coordinate system by taking a first point of a contact surface of a capacitive touch screen as an origin, a Z axis of the spatial rectangular coordinate system being perpendicular to the contact surface.

The first determining module 302 is configured to acquire an X-axis coordinate and a Y-axis coordinate, in the spatial rectangular coordinate system, corresponding to a first sensor, where the first sensor is a sensor of the capacitive touch screen that forms the coupling capacitance along with at least one operating body and has the greatest capacitance change signal increase. In some embodiments, the first determining module 302 is configured to acquire an output pin index of an integrated circuit of the capacitive touch screen corresponding to the first sensor, and determine the output pin index as the X-axis coordinate and the Y-axis coordinate of the at least one operating body in the spatial rectangular coordinate system. Further, the first determining module 302 is specifically configured to prestore a correspondence between output pin indexes and coordinates in the spatial rectangular coordinate system; and determine an X-axis coordinate and a Y-axis coordinate corresponding to a current output pin index in the spatial rectangular coordinate system according to the correspondence.

The second determining module 303 is configured to acquire a difference between first coupling capacitance and second coupling capacitance, and determine a Z-axis coordinate of the at least one operating body in the spatial rectangular coordinate system according to the difference, where the first coupling capacitance is coupling capacitance formed between the first sensor and a first signal line of the capacitive touch screen when the Z-axis coordinate corresponding to the at least one operating body is beyond a preset interval, and the second coupling capacitance is coupling capacitance formed between the first sensor and the first signal line when the Z-axis coordinate corresponding to the at least one operating body is within the preset interval.

The second processing module 304 is configured to generate a movement trajectory of the at least one operating body according to changes in spatial coordinates of the at least one operating body in the spatial rectangular coordinate system, and obtain a gesture recognition result by recognizing the movement trajectory, where the spatial coordinates include: the X-axis coordinate, the Y-axis coordinate and the Z-axis coordinate.

In an optional implementation, the second determining module 302 is specifically configured to:
acquire an capacitance input to the first sensor from a charging module of an integrated circuit of the capacitive touch screen, where the charging module is configured to input capacitance to a sensor of which a capacitance change signal is increased in the capacitive touch screen, so as to reduce the capacitance change signal of the sensor; and
determine that the capacitance input to the first sensor is the difference between the first coupling capacitance and the second coupling capacitance.

In an optional implementation, the second determining module 302 is specifically configured to:
determine the Z-axis coordinate of the at least one operating body in the spatial rectangular coordinate system according to a first formula and the difference;
the first formula specifically being:

$$d = \frac{\varepsilon S}{4\pi k C_f}$$

where d represents the Z-axis coordinate of the at least one operating body in the spatial rectangular coordinate system, $C_f$ represents the difference, ε represents is a relative dielectric constant, S represents an effective overlapping area between the at least one operating body and the first sensor, and k represents an electrostatic force constant.

In an optional implementation, the second processing module 304 is specifically configured to:
determine whether a Z-axis coordinate of any spatial coordinates of the at least one operating body in the spatial rectangular coordinate system is within the preset interval;
in response to the Z-axis coordinate of any spatial coordinates of the at least one operating body in the spatial rectangular coordinate system being within the preset interval, determine that the any spatial coordinates are valid spatial coordinates; and
generate the movement trajectory of the at least one operating body according to changes in the valid spatial coordinates.

Figure 4:
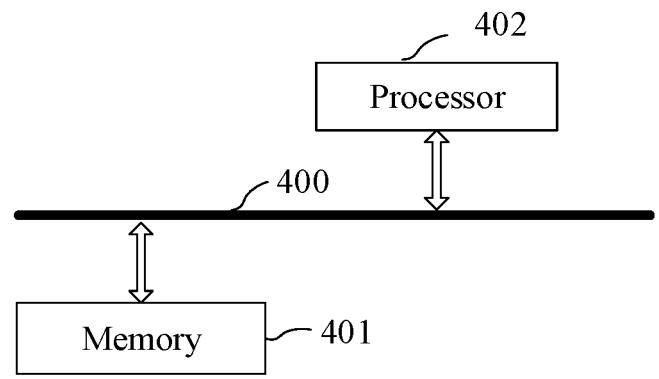
FIG. 4 is a schematic structural diagram of a system of gesture recognition based on coupling capacitance in embodiments of the disclosure.

On the basis of the same disclosed concept, embodiments of the disclosure provide a system of gesture recognition based on coupling capacitance. With reference to FIG. 4, the system of gesture recognition based on coupling capacitance includes at least one processor 402 and a memory 401 connected to the at least one processor. In embodiments of the disclosure, a specific connection medium between the processor 402 and the memory 401 is not limited. In FIG. 4, an example in which a processor 402 is connected with a memory 401 via a bus 400 is taken, the bus 400 being indicated by a bold line in FIG. 4, and a connection mode between other components being only schematically illustrated and being not limitative. The bus 400 may be divided into an address bus, a data bus, a control bus, etc. For convenience of illustration, only one bold line is shown in FIG. 4, but does not represent only one bus or one type of bus.

In embodiments of the disclosure, the memory 401 stores an instruction that may be executed by the at least one processor 402, and the at least one processor 402 executes the steps of the above method of gesture recognition based on coupling capacitance by calling the instructions stored in the memory 401. The processor 402 is a control center of the system of gesture recognition based on coupling capacitance, various parts of the whole system of gesture recognition based on coupling capacitance may be connected by means of various interfaces and lines, and various functions of the system of gesture recognition based on coupling capacitance may be implemented by executing instructions stored in the memory 401. Optionally, the processor 402 may include one or more processing units, and the processor 402 may integrate an application processor and a modem processor, where the application processor mainly processes an operating system, a user interface, an application program, etc., and the modem processor mainly processes wireless communication. It can be understood that it is possible that the above modem processor is not integrated into the processor 402. In some embodiments, the processor 402 and the memory 401 may be implemented on the same chip, or in some embodiments they may be implemented separately on separate chips.

The memory 401, which is a non-volatile computer-readable storage medium, may be configured to store non-volatile software programs, non-volatile computer-executable programs and modules. The memory 401 may include at least one type of storage medium, and may include, for example, a flash memory, a hard disk, a multimedia card, a card-type memory, a random access memory (RAM), a static random access memory (SRAM), a programmable read only memory (PROM), a read only memory (ROM), an electrically erasable programmable read-only memory (EEPROM), a magnetic memory, a magnetic disk, an optical disk, etc. The memory 401 is, but is not limited to, any other medium that may be configured to carry or store desired program code in the form of instructions or data structures and that can be accessed by a computer. The memory 401 in embodiments of the disclosure may also be a circuit or any other apparatus capable of implementing a storage function, and is configured to store program instructions and/or data.

The processor 402 may be a general-purpose processor, such as a central processing unit (CPU), a digital signal processor, an application specific integrated circuit, or a field programmable gate array, a discrete gate or transistor logic device, or a discrete hardware assembly, and may implement or execute all the methods, steps, and logic blocks in the embodiments of the disclosure. The general-purpose processor may be a microprocessor, any conventional processor, etc. The steps of the method of gesture recognition based on coupling capacitance disclosed in combination with the embodiments of the disclosure may be executed directly through a hardware processor, or executed by combining hardware and software modules in a processor with each other.

By designing and programming the processor 402, the code corresponding to the method of gesture recognition based on coupling capacitance introduced in the foregoing embodiment may be solidified into the chip such that the chip may execute the steps of the method of gesture recognition based on coupling capacitance during operation. How to design and program the processor 402 is well known to those skilled in the art, and will not be repeatedly described herein.

On the basis of the same disclosed concept, an embodiment of the disclosure further provides a storage medium, which stores computer instructions. When the computer instructions are executed on a computer, the computer executes the steps of the method of gesture recognition based on coupling capacitance.

In some possible implementations, various aspects of the method of gesture recognition based on coupling capacitance provided in the disclosure may also be implemented in the form of a program product including program code. When run on a system of gesture recognition based on coupling capacitance, the program code is configured to cause the system of gesture recognition based on coupling capacitance to execute the steps of the method of gesture recognition based on coupling capacitance according to various exemplary implementations of the disclosure described above in the description.

Those skilled in the art should understand that the embodiments of the disclosure can be provided as methods, systems, or computer program products. Therefore, the disclosure can employ full hardware embodiments, full software embodiments, or software and hardware combined embodiments. Moreover, the disclosure can take the form of a computer program product that is implemented on one or more computer available storage media (including, but not limited to, a disk memory, a compact disk read-only memory (CD-ROM), an optical memory, etc.) that encompass computer available program codes.

The disclosure is described with reference to flow charts and/or block diagrams of the methods, devices (systems), and computer program products according to the disclosure. It should be understood that each flow and/or block in the flow charts and/or block diagrams and combinations of the flows and/or blocks in the flow charts and/or block diagrams can be implemented through the computer program instructions. The computer program instructions can be provided for a processor of a general-purpose computer, a special-purpose computer, an embedded processor, or other programmable data processing devices, to produce a machine, such that instructions executed by the processor of the computer or other programmable data processing devices produce an apparatus used for implementing functions specified in one or more flows of each flow diagram and/or one or more blocks of each block diagram.

The computer program instructions may also be stored in a computer-readable memory that is capable of guiding a computer or other programmable data processing devices to work in a specific manner, such that the instructions stored in the computer-readable memory produce an article of manufacture including an instruction apparatus, and the instruction apparatus implements functions specified in one or more flows of each flow diagram and/or one or more blocks in each block diagram.

These computer program instructions may also be loaded onto the computer or other programmable data processing devices, such that a series of operations and steps are executed on the computer or other programmable devices, thereby generating computer-implemented processing. Therefore, the instructions executed on the computer or other programmable devices provide steps for implementing functions specified in one or more flows of each flow diagram and/or one or more blocks in each block diagram.

Obviously, those skilled in the art can make various modifications and variations to the disclosure without departing from the spirit and scope of the disclosure. In this way, if these modifications and variations of the disclosure fall within the scope of the claims of the disclosure and equivalent technologies thereof, the disclosure is further intended to include these modifications and variations.

What is claimed is:

1. A method of gesture recognition based on coupling capacitance, comprising:

establishing a spatial rectangular coordinate system by taking a first point of a contact surface of a capacitive touch screen as an origin, a Z axis of the spatial rectangular coordinate system being perpendicular to the contact surface;

acquiring an X-axis coordinate and a Y-axis coordinate, in the spatial rectangular coordinate system, corresponding to a first sensor electrode, wherein the first sensor electrode is a sensor electrode of the capacitive touch screen that forms the coupling capacitance along with at least one operating body and has a greatest capacitance change signal increase;

acquiring a difference between first coupling capacitance and second coupling capacitance, and determining a Z-axis coordinate of the at least one operating body in the spatial rectangular coordinate system according to the difference, wherein the first coupling capacitance is coupling capacitance formed between the first sensor electrode and a thin film transistor (TFT) power signal control line of the capacitive touch screen when the Z-axis coordinate corresponding to the at least one operating body is beyond a preset interval, and the second coupling capacitance is coupling capacitance formed between the first sensor electrode and the TFT power signal control line when the Z-axis coordinate corresponding to the at least one operating body is within the preset interval;

generating a movement trajectory of the at least one operating body according to changes in spatial coordinates of the at least one operating body in the spatial rectangular coordinate system, wherein the spatial coordinates comprise the X-axis coordinate, the Y-axis coordinate and the Z-axis coordinate; and obtaining a gesture recognition result by recognizing the movement trajectory;

wherein the acquiring the X-axis coordinate and the Y-axis coordinate, in the spatial rectangular coordinate system, corresponding to the first sensor electrode comprises:

acquiring an output pin index of an integrated circuit of the capacitive touch screen corresponding to the first sensor electrode, and determining the output pin index as the X-axis coordinate and the Y-axis coordinate of the at least one operating body in the spatial rectangular coordinate system.

2. The method according to claim 1, wherein the determining the output pin index as the X-axis coordinate and the Y-axis coordinate of the at least one operating body in the spatial rectangular coordinate system comprises:

prestoring a correspondence between output pin indexes and coordinates in the spatial rectangular coordinate system; and determining an X-axis coordinate and a Y-axis coordinate corresponding to a current output pin index in the spatial rectangular coordinate system according to the correspondence as the X-axis coordinate and the Y-axis coordinate of the at least one operating body in the spatial rectangular coordinate system.

3. The method according to claim 1, wherein the acquiring the difference between the first coupling capacitance and the second coupling capacitance comprises:

acquiring capacitance input to the first sensor electrode by a charging module of an integrated circuit of the capacitive touch screen, where the charging module is configured to input capacitance to a sensor electrode of which a capacitance change signal is increased in the capacitive touch screen; and determining the capacitance input to the first sensor electrode as the difference between the first coupling capacitance and the second coupling capacitance.

4. The method according to claim 3, wherein the determining the Z-axis coordinate of the at least one operating body in the spatial rectangular coordinate system according to the difference comprises:

determining the Z-axis coordinate of the at least one operating body in the spatial rectangular coordinate system according to a first formula and the difference;

the first formula being:

$$d = \frac{\varepsilon S}{4\pi k C_f}$$

wherein d represents the Z-axis coordinate of the at least one operating body in the spatial rectangular coordinate system, $C_f$ represents the difference, $\varepsilon$ represents a relative dielectric constant, S represents an effective overlapping area between the at least one operating body and the first sensor electrode, and k represents an electrostatic force constant.

5. The method according to claim 1, wherein the generating the movement trajectory of the at least one operating body according to the changes in spatial coordinates of the at least one operating body in the spatial rectangular coordinate system comprises:

determining whether a Z-axis coordinate of any spatial coordinates of the at least one operating body in the spatial rectangular coordinate system is within the preset interval;

determining that the any spatial coordinates are valid spatial coordinates in response to the Z-axis coordinate of the any spatial coordinates of the at least one operating body in the spatial rectangular coordinate system being within the preset interval; and generating the movement trajectory of the at least one operating body according to changes in the valid spatial coordinates.

6. The method according to claim 1, wherein the establishing the spatial rectangular coordinate system by taking the first point of the contact surface of the capacitive touch screen as the origin, the Z axis of the spatial rectangular coordinate system being perpendicular to the contact surface comprises:

establishing the spatial rectangular coordinate system by taking a center point of the contact surface of the capacitive touch screen as the origin, the Z axis of the spatial rectangular coordinate system being perpendicular to the contact surface.

7. An electronic device of gesture recognition based on coupling capacitance, comprising:
a memory configured to store a program instruction; and
a processor configured to call the program instruction stored in the memory to execute steps of a method comprising:
establishing a spatial rectangular coordinate system by taking a first point of a contact surface of a capacitive touch screen as an origin, a Z axis of the spatial rectangular coordinate system being perpendicular to the contact surface;
acquiring an X-axis coordinate and a Y-axis coordinate, in the spatial rectangular coordinate system, corresponding to a first sensor electrode, wherein the first sensor electrode is a sensor electrode of the capacitive touch screen that forms the coupling capacitance along with at least one operating body and has a greatest capacitance change signal increase;
acquiring a difference between first coupling capacitance and second coupling capacitance, and determining a Z-axis coordinate of the at least one operating body in the spatial rectangular coordinate system according to the difference, wherein the first coupling capacitance is coupling capacitance formed between the first sensor electrode and a thin film transistor (TFT) power signal control line of the capacitive touch screen when the Z-axis coordinate corresponding to the at least one operating body is beyond a preset interval, and the second coupling capacitance is coupling capacitance formed between the first sensor electrode and the TFT power signal control line when the Z-axis coordinate corresponding to the at least one operating body is within the preset interval;
generating a movement trajectory of the at least one operating body according to changes in spatial coordinates of the at least one operating body in the spatial rectangular coordinate system, wherein the spatial coordinates comprise the X-axis coordinate, the Y-axis coordinate and the Z-axis coordinate; and
obtaining a gesture recognition result by recognizing the movement trajectory;
wherein the acquiring the X-axis coordinate and the Y-axis coordinate, in the spatial rectangular coordinate system, corresponding to the first sensor electrode comprises:
acquiring an output pin index of an integrated circuit of the capacitive touch screen corresponding to the first sensor electrode, and determining the output pin index as the X-axis coordinate and the Y-axis coordinate of the at least one operating body in the spatial rectangular coordinate system.

8. The electronic device according to claim 7, wherein the determining the output pin index as the X-axis coordinate and the Y-axis coordinate of the at least one operating body in the spatial rectangular coordinate system comprises:
prestoring a correspondence between output pin indexes and coordinates in the spatial rectangular coordinate system; and
determining an X-axis coordinate and a Y-axis coordinate corresponding to a current output pin index in the spatial rectangular coordinate system according to the correspondence as the X-axis coordinate and the Y-axis coordinate of the at least one operating body in the spatial rectangular coordinate system.

9. The electronic device according to claim 7, wherein the acquiring the difference between the first coupling capacitance and the second coupling capacitance comprises:

acquiring capacitance input to the first sensor electrode by a charging module of an integrated circuit of the capacitive touch screen, where the charging module is configured to input capacitance to a sensor electrode of which a capacitance change signal is increased in the capacitive touch screen; and
determining the capacitance input to the first sensor electrode as the difference between the first coupling capacitance and the second coupling capacitance.

10. The electronic device according to claim 9, wherein the determining the Z-axis coordinate of the at least one operating body in the spatial rectangular coordinate system according to the difference comprises:
determining the Z-axis coordinate of the at least one operating body in the spatial rectangular coordinate system according to a first formula and the difference; the first formula being:

$$d = \frac{\varepsilon S}{4\pi k C_f}$$

wherein d represents the Z-axis coordinate of the at least one operating body in the spatial rectangular coordinate system, $C_f$ represents the difference, $\varepsilon$ represents a relative dielectric constant, S represents an effective overlapping area between the at least one operating body and the first sensor electrode, and k represents an electrostatic force constant.

11. The electronic device according to claim 7, wherein the generating the movement trajectory of the at least one operating body according to the changes in spatial coordinates of the at least one operating body in the spatial rectangular coordinate system comprises:
determining whether a Z-axis coordinate of any spatial coordinates of the at least one operating body in the spatial rectangular coordinate system is within the preset interval;
determining that the any spatial coordinates are valid spatial coordinates in response to the Z-axis coordinate of the any spatial coordinates of the at least one operating body in the spatial rectangular coordinate system being within the preset interval; and
generating the movement trajectory of the at least one operating body according to changes in the valid spatial coordinates.

12. The electronic device according to claim 7, wherein the establishing the spatial rectangular coordinate system by taking the first point of the contact surface of the capacitive touch screen as the origin, the Z axis of the spatial rectangular coordinate system being perpendicular to the contact surface comprises:
establishing the spatial rectangular coordinate system by taking a center point of the contact surface of the capacitive touch screen as the origin, the Z axis of the spatial rectangular coordinate system being perpendicular to the contact surface.

13. A non-transitory storage medium, storing a computer-executable instruction, wherein the computer-executable instruction is configured to cause a computer to execute steps of a method comprising:
establishing a spatial rectangular coordinate system by taking a first point of a contact surface of a capacitive touch screen as an origin, a Z axis of the spatial rectangular coordinate system being perpendicular to the contact surface;

acquiring an X-axis coordinate and a Y-axis coordinate, in the spatial rectangular coordinate system, corresponding to a first sensor electrode, wherein the first sensor electrode is a sensor electrode of the capacitive touch screen that forms the coupling capacitance along with at least one operating body and has a greatest capacitance change signal increase;

acquiring a difference between first coupling capacitance and second coupling capacitance, and determining a Z-axis coordinate of the at least one operating body in the spatial rectangular coordinate system according to the difference, wherein the first coupling capacitance is coupling capacitance formed between the first sensor electrode and a thin film transistor (TFT) power signal control line of the capacitive touch screen when the Z-axis coordinate corresponding to the at least one operating body is beyond a preset interval, and the second coupling capacitance is coupling capacitance formed between the first sensor electrode and the TFT power signal control line when the Z-axis coordinate corresponding to the at least one operating body is within the preset interval;

generating a movement trajectory of the at least one operating body according to changes in spatial coordinates of the at least one operating body in the spatial rectangular coordinate system, wherein the spatial coordinates comprise the X-axis coordinate, the Y-axis coordinate and the Z-axis coordinate; and obtaining a gesture recognition result by recognizing the movement trajectory;

wherein the acquiring the X-axis coordinate and the Y-axis coordinate, in the spatial rectangular coordinate system, corresponding to the first sensor electrode comprises:

acquiring an output pin index of an integrated circuit of the capacitive touch screen corresponding to the first sensor electrode, and determining the output pin index as the X-axis coordinate and the Y-axis coordinate of the at least one operating body in the spatial rectangular coordinate system.

14. The non-transitory storage medium according to claim 13, wherein the determining the output pin index as the X-axis coordinate and the Y-axis coordinate of the at least one operating body in the spatial rectangular coordinate system comprises:

prestoring a correspondence between output pin indexes and coordinates in the spatial rectangular coordinate system; and determining an X-axis coordinate and a Y-axis coordinate corresponding to a current output pin index in the spatial rectangular coordinate system according to the correspondence as the X-axis coordinate and the Y-axis coordinate of the at least one operating body in the spatial rectangular coordinate system.

15. The non-transitory storage medium according to claim 13, wherein the acquiring the difference between the first coupling capacitance and the second coupling capacitance comprises:

acquiring capacitance input to the first sensor electrode by a charging module of an integrated circuit of the capacitive touch screen, where the charging module is configured to input capacitance to a sensor electrode of which a capacitance change signal is increased in the capacitive touch screen; and determining the capacitance input to the first sensor electrode as the difference between the first coupling capacitance and the second coupling capacitance.

16. The non-transitory storage medium according to claim 15, wherein the determining the Z-axis coordinate of the at least one operating body in the spatial rectangular coordinate system according to the difference comprises:

determining the Z-axis coordinate of the at least one operating body in the spatial rectangular coordinate system according to a first formula and the difference; the first formula being:

$$d = \frac{\varepsilon S}{4\pi k C_f}$$

wherein d represents the Z-axis coordinate of the at least one operating body in the spatial rectangular coordinate system, $C_f$ represents the difference, $\varepsilon$ represents a relative dielectric constant, S represents an effective overlapping area between the at least one operating body and the first sensor electrode, and k represents an electrostatic force constant.

* * * * *